Figure 3:
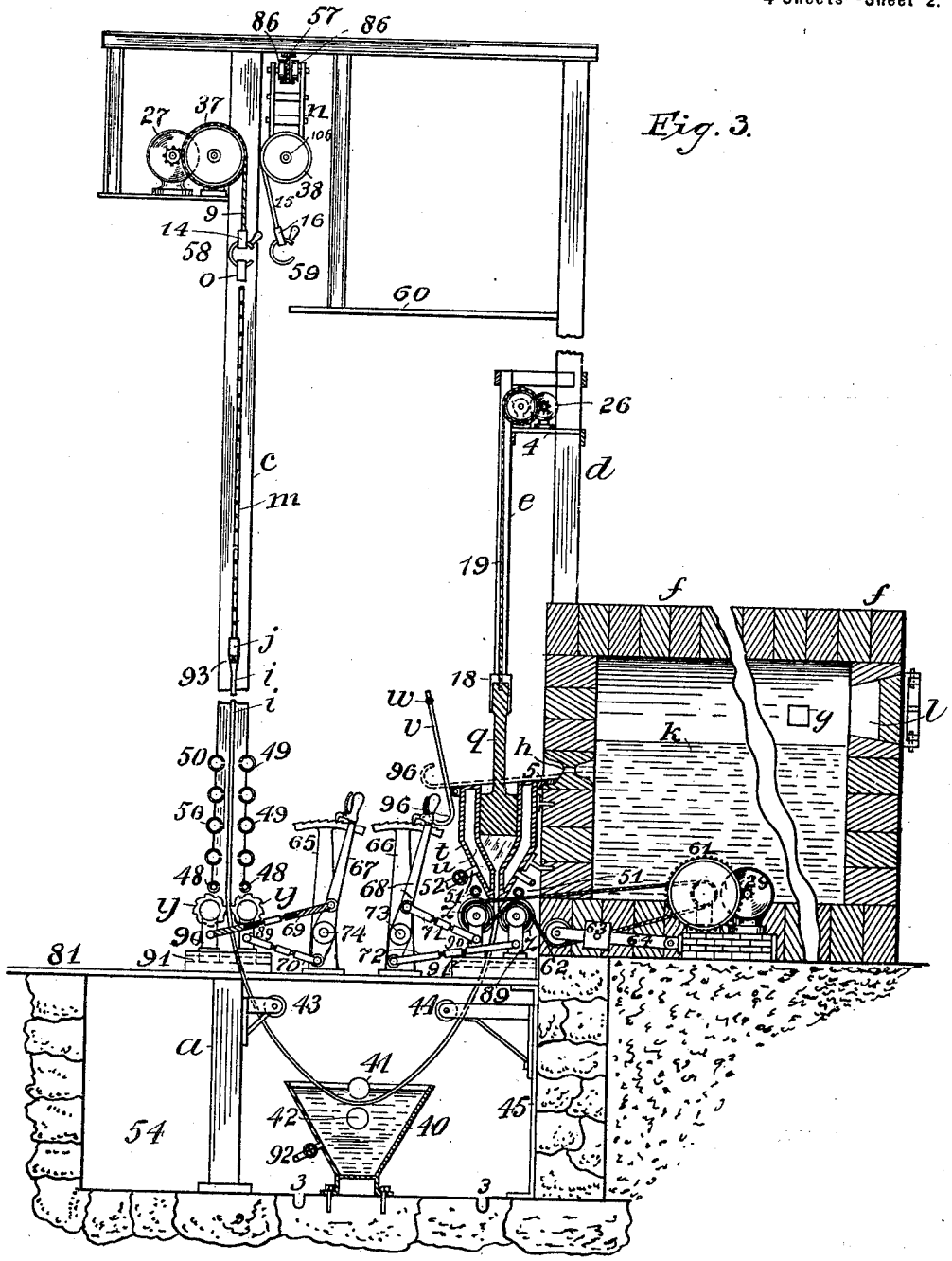

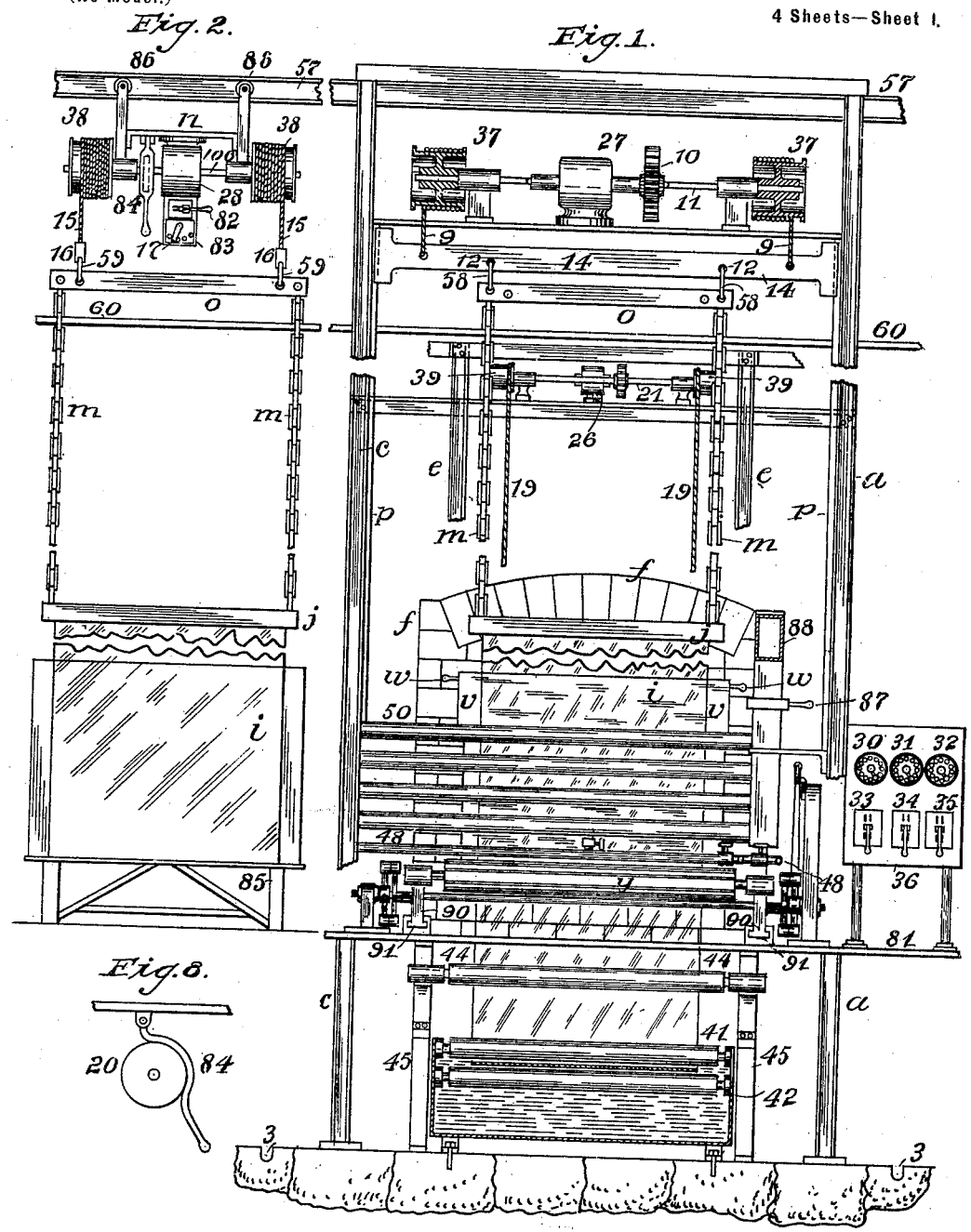

No. 696,007. Patented Mar. 25, 1902.
I. W. COLBURN.
GLASS WORKING MACHINE.
(Application filed Apr. 17, 1899. Renewed Aug. 17, 1901.)
(No Model.) 4 Sheets—Sheet 2.

WITNESSES.
INVENTOR.
Irving W. Colburn,
by Henry H. Bates,
ATTORNEY.

No. 696,007. Patented Mar. 25, 1902.
I. W. COLBURN.
GLASS WORKING MACHINE.
(Application filed Apr. 17, 1899. Renewed Aug. 17, 1901.)
(No Model.) 4 Sheets—Sheet 3.
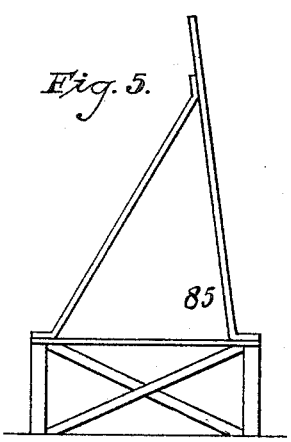
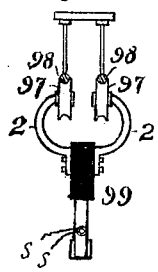
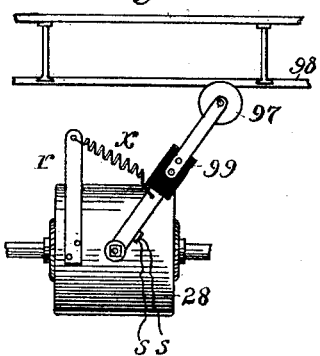
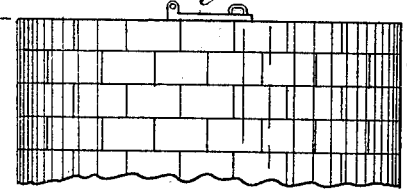
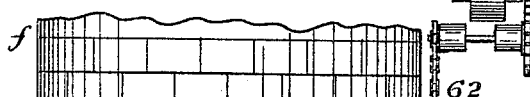
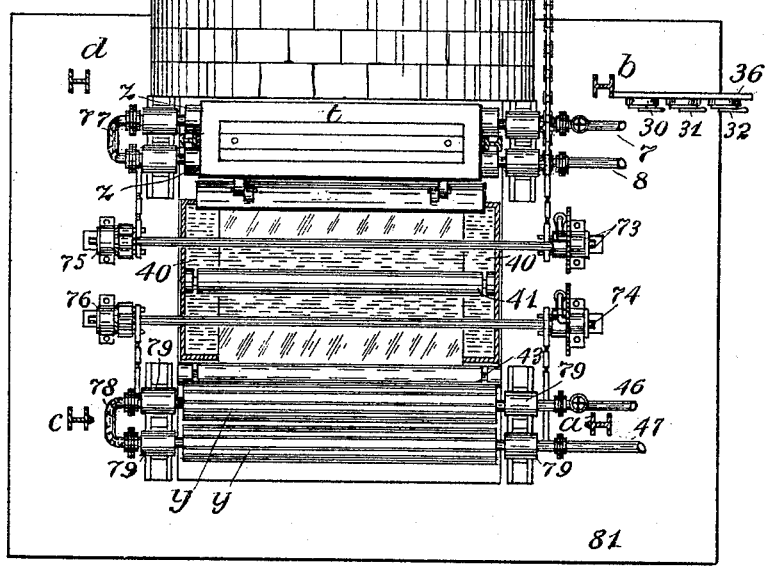
WITNESSES.
INVENTOR,
Irving W. Colburn,
by Henry H. Bates,
ATTORNEY.

No. 696,007. Patented Mar. 25, 1902.
I. W. COLBURN.
GLASS WORKING MACHINE.
(Application filed Apr. 17, 1899. Renewed Aug. 17, 1901.)
(No Model.) 4 Sheets—Sheet 4.
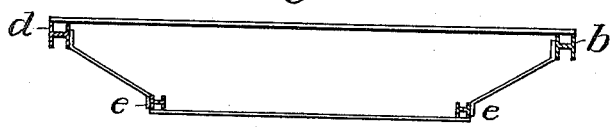
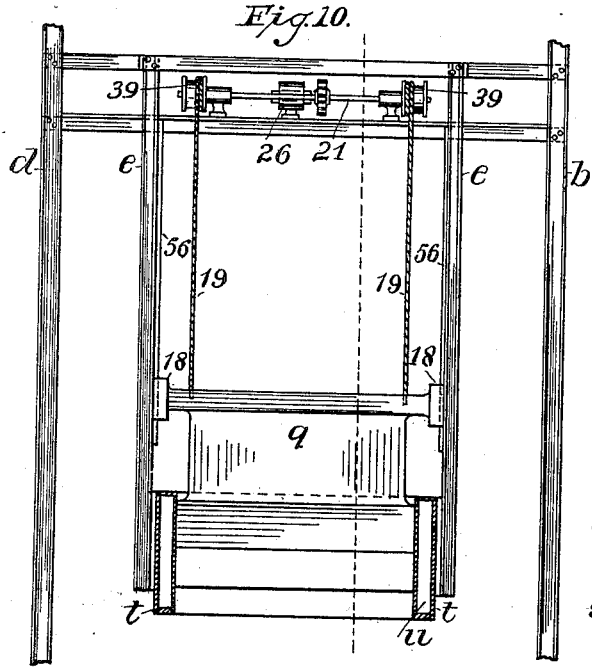
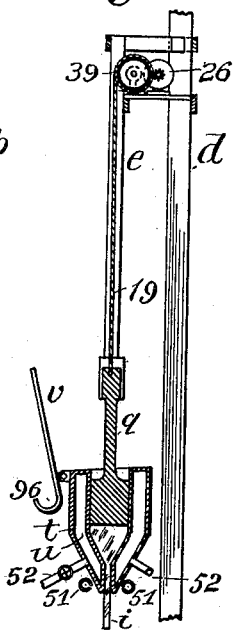
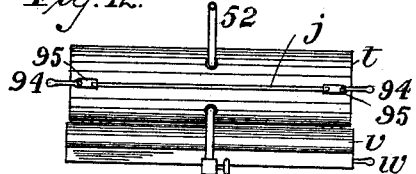
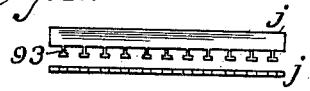
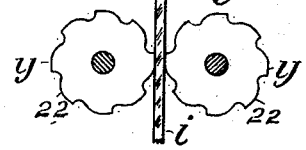
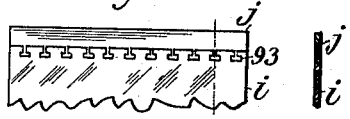
WITNESSES.
Aug. Scott
A. M. Long.
INVENTOR.
Irving W. Colburn,
by Henry H. Bates,
ATTORNEY.

UNITED STATES PATENT OFFICE.

IRVING W. COLBURN, OF TOLEDO, OHIO.

GLASS-WORKING MACHINE.

SPECIFICATION forming part of Letters Patent No. 696,007, dated March 25, 1902.

Application filed April 17, 1899. Renewed August 17, 1901. Serial No. 72,384. (No model.)

*To all whom it may concern:*

Be it known that I, IRVING W. COLBURN, a citizen of the United States, residing at Toledo, in the county of Lucas and State of Ohio, have invented certain new and useful Improvements in Glass-Working Machines; and I do hereby declare the following to be a full, clear, and exact description of the invention, such as will enable others skilled in the art to which it appertains to make and use the same.

My invention relates to a novel means or apparatus for rolling, pressing, and stretching plastic glass into sheets for the purpose of manufacturing plate and window glass.

It consists, primarily, in departing from the methods hitherto employed of manipulating glass in gatherings for each separate sheet and forms the glass in a continuous sheet as drawn progressively from a measuring vessel containing a sufficient collection of molten glass for an entire cycle of operation of the machine. The product is afterward cut up into commercial sizes. By this improved means I am enabled to utilize the largest-sized glass-melting tanks or pot-furnaces for the purpose and readily gather, roll, press, and stretch into plate and window glass the entire melting capacity of the tank with a small amount of attendance. I am enabled thereby to dispense with a number of skilled workmen. The employment of the outside collecting and measuring vessel in conjunction with means for collecting a measured quantity does away with the gatherers, while the rolling, drawing, pressing, and stretching mechanism enables me to dispense with the workmen known as "blowers," "snappers," and "flatteners." This apparatus therefore enables me to accomplish with a few men—*i. e.*, one skilled glass-worker and three helpers or attendants—the work that is now accomplished by a much larger number of men working by the hand process of making sheet-glass and to produce better work at a speed of production never approached in hand work. It enables me to produce sheet-glass with a perfectly smooth, even, clear, and brilliant surface ready to be cut into sheets of the proper size and carried direct to the annealing-ovens without further manipulation. I am also enabled to produce window-glass of a perfectly even thickness and to vary the thickness at will, if desired. I can produce plates or sheets of any desired thickness, uniform or variable, the speed of the machine and all the regulating mechanisms being under perfect control during all stages of the operation.

My said invention is designed for dealing with plastic glass in considerable masses in a fluent state and at a high temperature, bringing it to the rolling, drawing, and stretching mechanism in a continuous stream in the proper condition of plasticity for working and thereafter working the entire mass into finished plates or sheets by the means about to be described.

In the drawings forming a part of this specification, Figure 1 is a front elevation, partly in section, of the main frame, glass-tank, underground pit, water cooling vessel, drawbars, water cooling-pipes, air cooling-pipes, stretching mechanism, hand-levers, switchboard, &c. Fig. 2 is a front elevation showing the drawing-chains and attached drawing-bar with a suspended sheet of glass attached broken away in the middle and the cutting-table underneath, on which the glass is cut up into commercial sizes, also the traversing motor and accessories. Fig. 3 is a side elevation, partly in section, showing the melting glass-tank, the main frame of the glass-machine, the stretching mechanism, the receptacle for collecting a measured quantity of glass, the mechanism for assisting the plastic glass to travel through the slot in the bottom of the receptacle, the rolls for rolling the plastic glass, the pipes containing water to cool the same, the pit underneath the floor, the water cooling-tank, the draw or pressure bars, the water and air cooling-pipes, the levers and mechanism for operating the rolls and pressure-bars, the motor for driving the rolls, the motor for lifting the weight $q$, the traversing motor, and the motor for stretching the glass, with its attached mechanism. Fig. 4 is a plan view of the glass-melting tank, the motor for operating the rolls and its connecting devices, the collecting vessel, the rolls for rolling the plastic glass, the pressure-bars, the water cooling-tank, the water cooling-pipes, the air cooling-pipes, the lever mechanism and connecting-shafts for operating the rolls and pressure-bars, the water circulation, the switchboard, &c. Fig. 5 is a view of the inclined cutting-table. Fig. 6 is a detail view showing the mode of introducing the electrical current to the traversing motor. Fig. 7 is a side view of the device for introducing the electrical current to the traversing motor. Fig. 8 is a side view of the hand-brake shown in the upper part of Fig. 2. Fig. 9 is a plan view showing the two main back-supporting girders of the frame of the machine, also the two extra girders which are attached to the sides of the measuring and collecting vessel to assist in supporting the motor 26 and its connecting mechanism for lifting the weight $q$. Fig. 10 is a front elevation of the upright girders or I-beams, also the glass measuring and collecting vessel, also the pressure-weight $q$ and the motor 26, with its operating train of gearing and drums, lifting-ropes, &c. Fig. 11 is an end elevation showing same parts as shown in Fig. 10, partly in section. Fig. 12 is a view looking directly under the glass measuring and collecting vessel, also showing the water circulation for cooling the walls of said vessel, also hand-levers 94, which hold the bar $j$ in position while the plastic glass is being collected in vessel and attached to said bar. Fig. 13 shows a side and bottom view of the bar $j$, adapted to fit into the bottom slot of the measuring vessel, and the T-shaped projections for the plastic glass to cast to and adhere to. Fig. 14 is another view of the bar $j$, showing a front and side elevation of the bar with the glass attached to the same. Fig. 15 is an end view, partly in section, showing the pressure-bars with a piece of plastic glass between. Fig. 16 shows the water cooling-pipes with their controlling-valves. These cooling-pipes are directly over the rolls, as shown in Fig. 3.

Like letters and numerals of reference refer to like parts on the several figures.

Referring to the drawings, $f$ represents a glass-melting tank, preferably arched on the top, broken away in the middle, as shown in Figs. 3 and 4, to economize space in the drawings.

$k$ is the melted glass in the tank. The melting is preferably done with gas and by the regenerator process, flame-ports, one of which is shown at $g$, being arranged in the parallel side walls on both sides toward the rear of the furnace.

$l$ is the charging-hole in the rear wall, closed by a door having suitable means for operating the same. In the front wall there is a portion of the wall of the tank made thin, with an aperture or passage-way $h$ therein for drawing out melted or fluent glass from under the surface of the glass in the said tank, whereby nothing but refined glass of best quality, suitable for the production of the best sheet-glass, is withdrawn. The glass should be thoroughly mixed and in best condition for operation. The floating scum and dirt cannot flow through this aperture, as it is some distance below the surface. This opening to the furnace is stopped by means of fire or pot clay applied moist on the end of a long wooden pole, similar to the way in which iron flowing from a blast-furnace is stopped. When it is desired to open this aperture to obtain a gathering of glass, the stopping is broken open with a long rod of metal pointed at the end in a similar way to that employed in opening a blast-furnace for the pouring of metal.

$t$ is a collecting vessel for the fluent glass as it comes from the furnace at a high temperature. This vessel has a water-jacket circulation $u$ provided entirely around it on all sides, with a suitable means of supply (pipe 25) for the purpose of keeping the vessel and its contents at the proper temperature and to assist in cooling the fluent glass to the temperature and plasticity required for working. This vessel has a slotted passage-way for fluent glass in the hopper-shaped bottom thereof, through which the glass is withdrawn at stated periods by means hereinafter described. The vessel has also a cover $v$ hinged to its top, as shown in the drawings. Said cover is provided with an upturned receptacle 96 at the forward edge thereof for purposes hereinafter described.

In front of and embracing the arch of the tank is erected a framework carrying platforms for sustaining the stretching and drawing motor mechanisms of the apparatus. The framework consists of the vertical I-beams $a\ b\ c\ d$, sustaining platforms 60 and 61 for the operators and carrying trackway 57 for the traveling motor 28 and sustaining also motor 27 for operating the drawing mechanism and motor 26 for operating the glass-expelling mechanism. There are also the upright girders $e$, braced to girders $b$ and $d$ and having vertical ways 56 56 thereon.

Below the level of the floor 81 and that of the bottom of the tank is a pit 54, containing a water-tank 40 for cooling the rolled glass in which are rolls 41, said tank being supplied by means of pipe 92.

43 and 44 are guide-rolls for the sheet of glass located in the pit, roll 44 being sustained on supporting-girder 45, which also supports the floor 81. 3 3 are drain-channels to keep the pit dry.

Close to the aperture of the jacketed vessel $t$ is a pair of rolls $z\ z$, mounted in movable bearings and arranged so as to be capable of approximation and separation by suitable mechanism, the space between the rolls being at all times directly under and in alinement with the slot in the bottom of vessel $t$, through which the plastic glass flows directly to the rolls. Said rolls are hollow and are supplied with means for circulating a current of water through them drawn from a suitable source of supply. Just above the rolls are horizontal perforated or slotted water-pipes 51, provided with valves 6, Fig. 10, for sprinkling the highly-heated glass as it issues from the measuring vessel and reducing its temperature to a workable degree.

29 is a rotary motor, preferably electric, receiving its supply of energy from an outside source of power and communicating rotary motion through a suitable train of gearing and sprocket-chain belting to the rolls simultaneously. It does this preferably by means of an endless sprocket-chain enwrapping sprocket-gears on the ends of the roll-shafts passing between the said sprocket-gears to give the requisite coöperative direction to the rolls. Said chain is long enough to have a bight in the slack thereof, in which runs an idle sprocket-pulley mounted on a pivoted radius-arm 64, on which radius-arm is a sliding or adjustable weight 63 of sufficient mass to keep the sprocket-chain always taut at the required tension to drive the rolls.

Directly opposite to the rolls $z$ $z$ are located on platform 81 and sustained by columns $a$ $c$ two pressure-bars or drawing-bars $y$ $y$, mounted in suitable bearings 79, which pressure-bars, as well as rolls $z$ $z$, are borne on movable supports 90 89, sliding in horizontal ways 91, so as to be capable by means of suitable mechanism of approximation and separation while the space between them is kept in the same place and in case of the rolls $z$ $z$ is in constant alinement with the slot or aperture in the bottom of vessel $t$. These pressure-bars are preferably made with multiple facets 22 22, as shown in Fig. 15, and are rotatable in their supports for adjustment for the purpose of readily and quickly bringing a new facet or surface which is perfectly fresh and true into contact with the plastic sheet of glass when the surface in use shows any signs of roughness or inequality from wear. They are made, preferably, of metal and hollow and are provided with a means of water circulation (pipes 46 47, flexible junction 78) from a suitable source of supply. The rolls are also similarly provided with a means of water circulation (pipes 7 8, flexible junction 77) to cool the same, as in the case of the pressure-bars.

Directly above the pressure-bars are located the sprinkling-pipes 48, supplied with numerous perforations and controlled by suitable cocks or valves as to the water-supply. Immediately over the said water-pipes are arranged in vertical series the air cooling-pipes 49 50, formed with perforations, slits, or apertures directed toward the sheet of plastic glass for the purpose of cooling the same. These air-pipes are supplied with air from an outside source, such as a large fan-blower, by means of the air-conduit 88, connected with all the pipes, the blast being regulated and controlled by means of the hand gate or valve 87.

High up on a platform supported by the vertical columns $a$ $c$ is located a motor 27, preferably electric, whose armature-shaft is connected by a suitable train of gearing 10 with a horizontal rotary shaft 11, carrying drums 37 37, on which as said shaft is revolved by said motor wind or unwind the flexible bands, ropes, chains, or wire cords 9 9, firmly connected at their lower ends to the transverse bar 14, which as said ropes or bands wind or unwind upon the drums travels up or down in a horizontal position, being guided at the ends in or upon guideways $p$ $p$, affixed to the vertical columns $a$ $c$. Said bar has perforations 12 12, in which loosely run the circular segments 58 58, which have the function of detachable hooks. They can be rotated in the said perforations by their handles, and they connect with another transverse bar $o$ by means of perforations 13 13. From this bar $o$ depend the chains $m$ $m$, which connect at their lower ends with the transverse anchor-bar $j$, the function of which is presently to be described.

At the top of the framework supported by the vertical columns $a$ $c$ is also sustained a horizontal trackway 57, which may be either straight or circuitous, preferably the latter. On this trackway runs a suspensory carrier or car $n$, borne by wheels 86 86, which carries a horizontal rotary shaft 106, sustained in suitable bearings, a rotary electric motor 28, by which said shaft is rotated, and drums 38 38, mounted on said shaft, rotating with it. These drums have suspensory bands, ropes, chains, or wire cords 15 15, which wind and unwind thereon as the shaft 106 is rotated, similar to the bands on drums 37, and said cords carry on their lower ends blocks 16, perforated to receive segmental ring-hooks 59 59, similar in function to the ring-hooks 58. These drums and suspensory cords are somewhat nearer together than are the drums and cords on shaft 11, and the ring-hooks 59 hook into perforations in bar $o$ especially provided for them. Platform 60 affords a footing and working space for the helper at this point.

Attached to the motor 28 is a dependent switchboard 83, within easy reach of the attendant on platform 60, carrying a regulating-rheostat 17 for said motor 28 and a reversing-switch 82 to enable the operator to regulate the current and turn it on and off and to reverse the same in order to reverse the direction of revolution of the drums 38 when necessary. The current is brought to the motor in this case on the positive and negative wires 98, (see Figs. 6 and 7,) on which traverse the conductor-trolleys 97 97, conveying the current from an outside source of energy to the rheostat and the reversing-switch through the two conductive insulated arms 2 2 and thence to the armature of the motor. The said arms are pivoted to the motor, and the trolley-wheels 97 are held up against the conductor-wires 98 by the tension of the spring $x$, attached to the said arms at one end and secured to fixed stud $r$ on the motor at the other end.

99 is an insulating-block provided to separate the currents passing through arms 2 2, which are electrically joined to the conductor-wires s s, that pass to the rheostat and the reversing-switch.

84 is a hand friction-brake operating on friction-drums 20, by which the operator modifies the revolution of drums 38 independently of the electrical appliances.

85 is an inclined cutting-table, supported on a suitable framework and located at a convenient point directly under the elevated trackway 57 to receive the glass transferred by means of the traveling carrier from the drawing and stretching apparatus to the place where it is cut up into commercial sizes.

On the floor 81 is sustained a switchboard 36, upon which are mounted three reversing-switches 33 34 35 for reversing the currents and direction of rotation of the motors 27, 29, and 26, respectively, and three regulating-rheostats 30 31 32, by which the currents which supply energy to the respective electric motors 27, 29, and 26 are turned on and off and also graduated and regulated at will, or the current may in practice be turned on and off by means of the reversing-switches, leaving to the rheostats a regulating function solely. On the floor 81 is also located the mechanism by which the attendants operate the movements of the rolls and pressure-bars, an end elevation of which is shown in Fig. 3. This mechanism comprises, essentially, the rocking levers 67 68, pivoted upon standards 65 66, supplied at the top with curved ratcheted locking-racks, into the teeth of which the locking-pawls on the hand-levers 67 68 engage. The pedestals 89 90 of the rolls and the pressure-bars, respectively, are movably mounted in horizontal lubricated ways 91, and said pedestals are connected to the rocking levers, respectively, by pivoted links 69 70 71 72, which links preferably are supplied with extension-turnbuckles, as shown, to enable their lengths to be adjusted accurately. The links are pivotally attached to the said rocking levers above and below the rocking centers thereof at equal distances therefrom. By this arrangement a simultaneous and equal approximation or separation of the rolls and pressure-bars, respectively, is secured as the rocking levers are manipulated by the attendant, but any other equivalent mechanical device may be employed. To insure parallelism between the rolls and pressure-bars, respectively, in all positions, the pivots of the rocking levers are made as rocking shafts extending across the machine, having similar rocking levers on the other ends of the said shafts, connected by similar link connections with the corresponding pedestals on the other side.

It now remains to explain the accessories of the measuring and collecting vessel t, before referred to.

q is a massive weight, of metal or some weighty refractory substance, suspended directly above and fitting the mouth of the said measuring and collecting vessel.

26 is an electric motor located on an elevated platform 4, borne on the framework and connected by a train of gearing with a rotary shaft 21, mounted in suitable bearings, on which are drums 39 39, to which are connected winding and unwinding ropes, cords, bands, or chains 19, attached at their lower ends to a horizontal bar 18, traveling up and down in ways 56, formed on upright girders e e. Said bar 18 is suspended by said ropes directly over the center of the measuring vessel t and is capable of being traversed up and down by the action of the electric motor 26, whose movements are regulated and controlled by the attendant through the regulating-rheostat 32 on switchboard 36.

There is a bar j of refractory metal, (shown in detail in Figs. 13 and 14,) which fits the slot or aperture in the bottom of the vessel t, (shown in that position in Fig. 12,) having integrally formed thereon the T-shaped projections 93, by means of which the glass flowing into the vessel t surrounds the same and being slightly chilled by the contact therewith becomes attached and dovetailed thereto, thus making a sufficiently rigid contact or connection therewith to enable the bar to perform its functions, which are to draw the glass progressively from the measuring vessel, aided by the rolls and weight, and later on to stretch the sheet of plastic glass against the tension afforded by the pressure-bars. Instead of the T-shaped projections on the bar j shown I may use any other suitable and equivalent means for causing intimate union and adhesion between said bar and the plastic glass, so as to hold it with sufficient tenacity for drawing purposes, such as a cold seal of glass modeled on a terminal of proper construction, operating like the gathering-irons in use in hand operations, or a suitably-formed clamp.

Prior to opening the tank it is supposed to have been supplied with different batches of glass of the required quality, to which a high heat has been applied until it is full of melted glass of a proper temperature for working. The glass passes forward from the charging place toward the front, undergoing a fierce temperature during the passage, and reaching a high state of fluidity. After it passes the flame-ports and advances toward the front end of the tank the temperature becomes mitigated, the glass becomes more homogeneous and refined, and advances toward the more viscous and plastic state required for working. Before the tank is opened the cover v is placed in the inclined position shown in dotted lines in Fig. 3, its inner end resting upon a plate 5, which bridges the space between the tank-aperture and the vessel-wall. A breach is now made through the fire-clay which stops the opening. As soon as the tank is opened melted glass flows from the aperture h, and with it comes the refuse fire-clay or pot-clay used in sealing the aperture. This impure mixture flows down the declivity of the cover into the receptacle 96, which is designed for its collection. As soon as clear glass begins to flow from the aperture the cover should be turned up by the attendant by means of the handle $w$ into the position shown in clear lines in Fig. 3. The clear glass then flows freely along the bridge-piece 5 into the measuring vessel $t$. The refuse glass in the receptacle 96 may be removed at convenience. When the proper quantity of glass has flowed into the vessel $t$, making its adherence to the bar $j$, as before stated, the weight $q$, which has previously been elevated by means of the motor 26, cords 19, and bar 18, is allowed to descend upon the surface of the fluent glass under control of the rheostat 30, the glass meantime approaching the plastic condition for proper working by the influence of the temperature conditions afforded by the water-jacket circulation around the measuring vessel. The motor 27 is now set in motion by the attendant very slowly. This communicates a pull to the bar $j$, which should be previously released from its fixed position by swinging back the clamps 94, which have hitherto confined it, Fig. 12. Said motor is connected with bar $j$ by means of chains $m$ $m$, bar $o$, ring-hooks 58 58, winding-cords 9 9, and rotary drums 37 37, and exerts regulated drawing tension upon said bar $j$ and the sheet of glass attached thereto. The glass now leaves the vessel under gravity and the pressure due to the weight $q$ and the slight traction above referred to following the attached bar $j$, passing between the rolls, which are set into regulated motion by the attendant, the further cooling and consequent viscosity of the glass having been increased by jets from the sprinkling-pipes 51, situated just above the rolls. The weight follows the glass downward until a sufficient quantity for the working in hand is expelled. If the weight is made to conform in shape to that of the interior of the tank, the whole measuring may be expelled, or for this purpose a shoe of refractory material conforming in shape to the hopper-like form of the vessel $t$ may be fitted to the bottom of weight $q$. After passing the rolls the plastic sheet passes by roll 44 in the pit, which has no other function than simply to guide the sheet to its proper destination. The plastic sheet then passes into the water-tank 40 between rolls 41 42. These last-mentioned rolls also serve only a guiding function and to control the depth of immersion of the glass sheet in the water-tank. The sheet at this time is of such high temperature that the water has only a cooling effect upon it, which is not the case when the glass approaches the solidifying stage. The sheet of glass, still flexible, now passes, by reason of the traction exerted upon it, behind the guide-roll 43 up between the pressure-bars $y$ $y$, which by means of the regulated pressure brought upon them by the attendant at lever 67 are forced into sufficiently close contact with the plastic sheet to cause the same to stretch and elongate under the drawing tension still exerted on bar $j$. During this stretching it becomes attenuated and at the same time assumes a polished and brilliant surface, which is the condition which is desirable to fix permanently in the glass. To this end the cooling-spray pipes 48 48 come into play and immediately after the cooling air-jets from the series of air-pipes 49 50, placed above, which finally exhaust the glass of its plasticity and stretching qualities and cause it to set into its finished condition. The controlling of the drawing operation requires coöperative skill and judgment in the combined manipulation of the pressure-bars and of the drawing-motor 27 through its rheostat. The same is true of the coöperative management of rolls $z$ $z$, the motor 26, and the motor 29, which therefore require a skilled operative. Both rolls and pressure-bars may be paste-covered when the nature of the work in hand is such as to demand it. After the glass sheet has been thus rolled, stretched, polished, cooled, and finished the entire gathering of glass in the collecting vessel having been converted into a commercial product and the drawing machinery stopped it is necessary to remove the said product from the machine. This is accomplished as follows: An attendant on the upper platform takes hanging rings 59, suspended from drums 38 on carrier $n$, and inserts them in the holes in bar $o$, provided for that purpose. By the aid of the lifting-motor 28 he then takes tension off from the ring-hooks 58, by which the bar has been suspended during the drawing operation, and is thus enabled to release the ring-hooks 58 from the bar and suspend the glass sheet from the carrier $n$. The said carrier or car is thus moved along the trackway 57 until it comes over the inclined cutting-table 85, when by means of the reversing-switch, the rheostat, and the hand-brake appliances he lowers the sheet of glass upon the said table, when a cutter there stationed cuts the sheet of glass into the desired commercial sizes as the sheet is intermittently fed down to him by the attendant until he has exhausted the sheet. The glass is then conveyed to the annealing-ovens.

I do not limit myself to drawing the glass from the melting-tank, as this invention is just as well adapted to taking the glass from a pot-furnace. In such case the melted glass would be brought to the measuring vessel by suitable appliances and emptied therein until the proper gathering for one operation was collected. In some cases this would be the more convenient mode of operation, as pots from several furnaces could be brought and utilized in one machine.

The glass can be taken from any point of the melting-tank where convenient, as well as from the front side, as shown.

The rolls and pressure-bars can be shaped and arranged so as to form glass sheets of varying thickness as well as of uniform thickness.

I claim and desire to secure by Letters Patent—

1. In the making of sheet-glass, the combination of a receptacle for holding a measured portion of molten glass, a water-jacket surrounding said receptacle to regulate its temperature, means for supplying said jacket with a water circulation, means for withdrawing plastic glass from said receptacle in a continuous stream, means for cooling said plastic stream, means for progressively compressing and flattening said plastic stream into a sheet, and positive traction means applied at the end of the sheet after it leaves said compressing and flattening mechanism, for drawing, stretching and attenuating said sheet into a transparent and finished condition, substantially as specified.

2. In the making of sheet-glass, the combination of a jacketed receptacle for holding a measured portion of molten glass, means for withdrawing plastic glass from said receptacle in a continuous stream, means for cooling said plastic stream, a piston under regulated control for forcing the glass from said receptacle auxiliary to the withdrawing means, and means for progressively flattening said stream of glass into a sheet, substantially as specified.

3. In the making of sheet-glass, the combination of a jacketed receptacle for holding a measured portion of molten glass, means for withdrawing plastic glass from said receptacle in a continuous stream, means for progressively compressing and flattening said stream of plastic glass into a sheet, means for further cooling said plastic sheet, means for frictionally grasping said sheet on both sides by regulated pressure, and traction means engaging the end of said sheet to pull the same positively and draw, stretch and attenuate the same against the resistance of the said grasping means, substantially as specified.

4. In the making of sheet-glass, the combination of a receptacle for holding a measured portion of molten glass, means for withdrawing plastic glass from said receptacle in a continuous stream, a pair of rolls for progressively flattening said stream of plastic glass into a continuous sheet as it issues from said receptacle, traction means at the end of said sheet for forcibly withdrawing the same against resistance, and non-rotary in action but revolubly-adjustable pressure-bars for frictionally grasping said moving sheet, whereby the latter is drawn, stretched and attenuated into a transparent sheet above the said pressure-bars by the withdrawing force, substantially as specified.

5. In the making of sheet-glass, the combination of a receptacle for holding a measured portion of molten glass, means for withdrawing plastic glass from said receptacle in a continuous stream, a pair of rolls for progressively flattening said stream of plastic glass into a continuous sheet, a pair of non-rotary in action but revolubly-adjustable pressure-bars for frictionally grasping said sheet as it is withdrawn, means for regulating and controlling the distance between said rolls, and means for regulating and controlling the distance between said pressure-bars, substantially as specified.

6. In the making of sheet-glass, the combination of a receptacle for holding a measured portion of molten glass, means for withdrawing plastic glass from said receptacle in a continuous stream, means for cooling said plastic glass as it issues from said receptacle, a pair of rolls for flattening said glass into a continuous sheet, a cooling-tank in the path of said sheet, for still further cooling the same, a pair of pressure-bars for frictionally grasping said moving sheet, spraying-pipes provided with means for throwing jets or sprays of water upon said sheet above said pressure-bars, and a series of air cooling-pipes provided with means for throwing regulated jets of cool air upon said sheet, whereby the latter is reduced from its plastic state to a finished sheet, substantially as specified.

7. In an apparatus for making sheet-glass, a receptacle for holding a measured portion of molten glass, means for withdrawing plastic glass from said receptacle in a continuous stream, a pair of rolls in juxtaposition to said receptacle, means for internally cooling said rolls, means for regulating the distance between the rolls, a pair of non-rotatory in action but revolubly-adjustable pressure-bars, means for internally cooling the same, means for regulating the distance between said pressure-bars, and means for externally cooling a sheet of glass passing between said pressure-bars, substantially as specified.

8. In an apparatus for making sheet-glass, a receptacle for holding a measured portion of molten glass, having a slit or aperture in the bottom of the same, a means for closing said slit or aperture, a jacket surrounding said receptacle, with means for supplying the interspace with a current of cooling liquid, and a tilting cover $v$ provided with an upturned edge 96, substantially as specified.

9. In an apparatus for making sheet-glass, a receptacle for holding a measured portion of molten glass, having a slit or aperture in the bottom of the same, a means for closing said slit or aperture, a water-jacket surrounding said receptacle, with means for supplying the interspace with cooling liquid, a weight suspended above said receptacle of such dimensions as to fit the mouth thereof, and means for raising, lowering and regulating the descent of said weight upon the surface of the glass, whereby the latter is forced in regulated quantity through said aperture in a continuous stream, substantially as specified.

10. In an apparatus for making sheet-glass, a receptacle for holding a measured portion of molten glass, having a slit or aperture in the bottom of the same, a bar $j$ of dimensions to fit said aperture, said bar having T-shaped projections 93 formed thereon, traction means attached to said bar, and means for controlling and regulating the force and speed of said traction, substantially as specified.

11. In an apparatus for making sheet-glass, a receptacle for holding a measured portion of molten glass, means for withdrawing plastic glass from said receptacle in a continuous stream, means for flattening said glass into a plastic sheet as it is withdrawn, means for grasping said sheet frictionally, traction means at the end of said sheet for forcibly pulling the same against said frictional grasping means, whereby it is drawn, stretched and attenuated into a sheet of the requisite thinness and transparency, and means for cooling and setting said plastic sheet to a finished condition, substantially as specified.

12. In an apparatus for making sheet-glass, a receptacle for holding a measured portion of molten glass, means for withdrawing plastic glass from said receptacle in a continuous stream, a pair of rolls in proximity to said stream for flattening the same into a continuous sheet, means for applying regulated pressure to said sheet through the rolls, a pair of pressure-bars for grasping said sheet after it leaves the rolls, means for applying regulated pressure to said sheet through the pressure-bars, traction means engaging the end of said sheet to pull the same forcibly and thereby draw it against the frictional resistance of the pressure-bars, whereby it is stretched and attenuated to the required thinness and transparency, and means for cooling and setting the sheet, substantially as specified.

13. In an apparatus for making sheet-glass, a receptacle for holding a measured portion of molten glass, means for withdrawing plastic glass from said receptacle in a continuous stream, a pair of hollow rolls in proximity to said stream for flattening the same into a sheet, a means for producing a water circulation through the interiors of said rolls for cooling the same, a pair of non-revolving hollow pressure-bars for grasping said sheet after it leaves the rolls, a water circulation through the interiors of said pressure-bars, and traction means for positively drawing the said sheet against the resistance of the said pressure-bars and thereby elongating the sheet substantially as specified.

14. In an apparatus for making sheet-glass, a jacketed receptacle for holding a measured portion of molten glass, regulated means for withdrawing plastic glass from said receptacle in a continuous stream, a pair of rolls in proximity to said stream of plastic glass for flattening the same into a sheet, regulated means for driving said rolls continuously in the same direction with respect to their adjacent surfaces, means for controlling the distance between said rolls, means for grasping said sheet frictionally, means for exerting a regulated pull engaging the end of said sheet, whereby it is drawn and stretched beyond said grasping means, and means for cooling and setting the plastic sheet, substantially as specified.

15. In an apparatus for making sheet-glass, a receptacle for holding a measured portion of molten glass, having an inclined top, and a cover $v$ hinged thereto, said cover having an upturned edge forming the receptacle 96, as and for the purpose specified.

16. In an apparatus for making sheet-glass, the combination of a jacketed receptacle for holding a measured portion of molten glass, having a slot or aperture in the same, means for withdrawing plastic glass through said aperture in a continuous stream, a pair of rolls having the space between them in alinement with said aperture, means for regulating the space between said rolls, so as to be in constant alinement with said slot or aperture, and means for driving said rolls simultaneously in the same direction with respect to their adjacent surfaces, consisting of sprocket-wheels on the ends of the roll-shafts, an endless slack sprocket-chain passing over and between said sprocket-wheels, a motor in gear with said chain, and a weighted idle sprocket-pulley carried in the bight of the slack of said chain, whereby the rolls are driven without interference with the variable adjustment of the interspace of the said rolls, substantially as specified.

17. In an apparatus for making sheet-glass, a receptacle for holding a measured portion of molten glass, means for withdrawing plastic glass from said receptacle in a continuous stream, a pair of rolls for flattening said stream into a sheet, means for driving said rolls continuously in the same direction with respect to their adjacent surfaces, movable pedestals in which said rolls are mounted, and means whereby said pedestals and rolls may be simultaneously approximated or separated, thereby regulating the space between said rolls, and keeping it in perfect alinement with the plane of the plastic sheet, substantially as specified.

18. In an apparatus for making sheet-glass, a receptacle for holding a measured portion of molten glass, means for withdrawing plastic glass from said receptacle in a continuous stream, a pair of rolls for flattening said stream into a sheet, means for driving said rolls continuously in the same direction with respect to their adjacent surfaces, movable pedestals in which said rolls are mounted, rocking shaft 73, rocking levers on the ends of said shaft, lever-handle 68, and links connecting said rocking levers with said movable pedestals, whereby the distance between said rolls is regulated, and the space thereof kept in constant alinement with the plane of the plastic glass, substantially as specified.

19. In an apparatus for making sheet-glass, a receptacle for holding a measured portion of molten glass, means for withdrawing plastic glass from said receptacle in a continuous stream, a pair of rolls for flattening said stream into a sheet, a pair of pressure-bars for frictionally grasping said sheet of plastic glass, movable pedestals in which said pressure-bars are mounted, rocking shaft 74, rocking levers on the ends of said shaft, lever-handle 67, and links connecting said rocking levers with said movable pedestals, whereby the distance between said pressure-bars is regulated, and the interspace kept in the same position, substantially as specified.

20. In an apparatus for making sheet-glass, a pair of rolls for rolling plastic glass into a sheet, means for driving said rolls simultaneously in the same direction with respect to their adjacent surfaces, means for simultaneously moving the rolls to vary the distance between them with respect to a fixed central plane, means for internally cooling said rolls by a fluid circulation therethrough, and means for externally cooling said rolls and the sheet of plastic glass compressed thereby, substantially as specified.

21. In an apparatus for making sheet-glass, a receptacle for holding a measured portion of molten glass, means for delivering hot plastic glass from said receptacle in a continuous stream, a pair of rolls for rolling said stream of glass into a sheet, a pair of pressure-bars for frictionally grasping said plastic sheet, means for varying the distance between said pressure-bars, means for internally cooling said pressure-bars by a fluid circulation therethrough, and means for cooling the sheet of plastic glass as it passes between and beyond the pressure-bars, substantially as specified.

22. In an apparatus for making sheet-glass, means for delivering hot plastic glass in a continuous stream, a pair of rolls for rolling said continuous delivery of plastic glass into a sheet, means for cooling said sheet of plastic glass as delivered by the rolls, a pair of non-revolving pressure-bars for frictionally grasping said plastic sheet, and means for varying the distance between said pressure-bars, and thereby regulating the degree of frictional retardation of the plastic sheet, all combined substantially as specified.

23. In an apparatus for making sheet-glass, in combination, a means for delivering a continuous stream of plastic glass, means for flattening said stream into a sheet, means for grasping said plastic sheet on both sides by non-rotary contact, means engaging the end of said sheet to pull the same positively against the resistance of said grasping means, whereby it is elongated, and means for cooling and setting the plastic sheet, arranged beyond the grasping means and on each side of the sheet, substantially as specified.

24. In an apparatus for making sheet-glass, in combination, a means for delivering a continuous stream of plastic glass, means for flattening said stream into a sheet, means for engaging the end of said sheet for positively pulling it forward, means for retarding the sheet at a given point, whereby it is elongated and attenuated between the retarding-point and its extremity, and a means for cooling and setting the said plastic sheet, substantially as specified.

25. In an apparatus for making sheet-glass, a means for delivering hot plastic glass in a continuous stream, means for forming said continuously-delivered stream of glass into a sheet, a means for cooling said plastic sheet, a pair of non-rotatory pressure-bars, for frictionally grasping said plastic sheet, a means for drawing said plastic sheet progressively through said frictional grasping means, whereby the sheet is stretched and attenuated to the requisite degree of thinness and transparency, and means for cooling and setting the said sheet into a finished condition, all combined substantially as specified.

26. In an apparatus for making sheet-glass, a receptacle for plastic glass, an upright frame having parallel guideways thereon, a bar traversing upon said guideways, an electric motor for moving said bar, with means for starting, stopping and reversing the direction of motion of said motor and bar, traction devices $m\ m$ connected with said bar, and a bar $j$ at the extremities of said traction devices, formed with projections 93 for attachment to plastic glass, whereby the latter may be assisted and guided in its delivery in a continuous stream from said receptacle, substantially as specified.

27. In an apparatus for making sheet-glass, a means for delivering hot plastic glass in a continuous stream, a traction device for making juncture with said delivery, means for positively pulling the said device with its attached glass, a pair of rolls for flattening said stream of glass into a sheet, an electric motor for driving said rolls, and means for starting and stopping said motor and for regulating the speed of said motor and rolls, all combined substantially as specified.

28. In an apparatus for making sheet-glass, a means for delivering hot plastic glass in a continuous stream, a traction device for making juncture with said delivery, means for positively pulling said traction device, means for cooling said delivery, means for flattening said stream progressively into a sheet, an electric motor for operating said traction device, and means for starting, stopping and reversing said motor, and for regulating the speed thereof, all combined substantially as specified.

29. In an apparatus for making sheet-glass, a receptacle for plastic glass, an upright frame, an elevated trackway 57, a traveling carrier running on said trackway, a rotary shaft on said carrier, winding-drums on said shaft, bands or cords on said drums, with detachable hooks at the extremities, a transverse bar 59 with means for attachment to said detachable hooks, traction-chains $m\ m$, and a traction-bar $j$ at the extremities of said chains, formed with means for making a connection with plastic glass, whereby the latter may be assisted and guided in its delivery in a continuous stream from said receptacle, substantially as specified.

30. In an apparatus for making sheet-glass, a receptacle for holding a measured portion of molten glass, with forcing means for expelling plastic glass therefrom in a continuous stream, rolls for rolling said plastic stream progressively into a sheet, traction means for drawing, stretching and attenuating said sheet, and a traversing carrier for lifting, carrying away and depositing the product, with lifting and depositing means, in combination with a motor for operating the forcing means, a motor for operating the rolls, a motor for operating the traction means, and a motor for operating the lifting and depositing means on the carrier, with means for starting, stopping, reversing and regulating the speed of the respective motors, all substantially as specified.

31. In an apparatus for making sheet-glass, hollow pressure-bars $y$, $y$, adjustable rotatably, having facets 22, 22 formed thereon, whereby new faces may be presented to the glass, substantially as specified.

32. In an apparatus for making sheet-glass, in combination, a hopper-shaped receptacle for molten glass, having a water-jacket surrounding the same, and a slot or elongated aperture in the bottom of said hopper-shaped receptacle, a bar $j$, having T-shaped projections thereon, fitted to said aperture, and levers 94, 94, pivoted to the bottom of said receptacle, for holding said bar in place to stop the aperture thereof, substantially as specified.

33. In an apparatus for making sheet-glass, a receptacle for holding a measured portion of molten glass, having a water-jacket surrounding said receptacle with means for maintaining a fluid circulation therethrough, and having a slot or aperture in the bottom of said receptacle, spraying-pipes on each side of said aperture, a suspended weight above said receptacle, fitting the mouth thereof, means for lifting and lowering said weight, and means for regulating and controlling said lifting and lowering means, substantially as specified.

34. The combination of a measuring-tank, having an aperture in the bottom, means for expelling plastic glass from said aperture, means for forming said expelled glass into a sheet, a water-tank in which sheet is immersed, for cooling the same, pressure-bars for grasping said sheet, drawing and stretching means for elongating and attenuating said sheet, and means for cooling and setting the plastic sheet, substantially as specified.

35. The combination of the rolls $z$, $z$, movable pedestals 89, 90, rocking lever 68, shaft 73, standard 66, and adjustable links 71, 72, substantially as specified.

36. The combination of pressure-bars $y$, $y$, movable pedestals 89, 90, rocking lever 67, rock-shaft 74, and adjustable links 69, 70, substantially as specified.

37. The combination of hopper-shaped apertured receptacle $t$, provided with water-jacket $u$, hinged cover $v$, provided with receptacle 96, suspensory weight $q$, with means for raising and lowering the same, bar $j$, provided with T-shaped projections 93, and means for removably retaining said bar in place in the aperture of said receptacle, substantially as specified.

38. In an apparatus for making sheet-glass, a receptacle for hot plastic glass, means for withdrawing glass from said receptacle, a pair of rolls for compressing said glass into a plate or sheet, means for varying and regulating the space between said rolls, and means for driving said rolls, consisting of a slack sprocket-chain, sprocket-wheels on the ends of the rolls, and a weighted idle sprocket-pulley in the bight of the slack of the sprocket-chain, whereby the rolls are driven without interfering with the variable adjustment of the interspace of the said rolls, substantially as specified.

39. In an apparatus for making sheet-glass, a pair of rolls for rolling plastic glass into a sheet or plate, a pair of non-rotatory pressure-bars for frictionally grasping said sheet or plate, means for varying the distance between said pressure-bars, and means for internally cooling said pressure-bars by a fluid circulation, substantially as specified.

40. In an apparatus for making sheet-glass, in combination, an upright frame having parallel guideways thereon, a bar traversing upon said guideways, an electric motor for moving said bar, with means for reversing the direction of motion of said motor and bar, and means attached to said bar and moving therewith, for forming attachment to hot plastic glass, substantially as specified.

41. In an apparatus for making sheet-glass, an upright frame with parallel guideways, an elevated platform, an electric motor thereon, a transverse shaft with winding-drums, geared to and operated by said motor, an elevated trackway, a carrier traveling on said trackway, a rotary shaft with winding-drums borne on said carrier, and a traveling motor on said carrier, geared to and operating said rotary shaft, with reversing means, substantially as specified.

In testimony whereof I affix my signature in presence of two witnesses.

IRVING W. COLBURN.

Witnesses:
FRANK I. ISBELL,
HARRIET A. LEMMON.